United States Patent
El Cheikh et al.

(10) Patent No.: US 8,910,672 B2
(45) Date of Patent: Dec. 16, 2014

(54) POWDERED DRINK MIX DISPENSING ASSEMBLY

(76) Inventors: Henry El Cheikh, Epping (AU); Claudette El Cheikh, Mitcham (AU)

( * ) Notice: Subject to any disclaimer, the term of this patent is extended or adjusted under 35 U.S.C. 154(b) by 276 days.

(21) Appl. No.: 13/544,284

(22) Filed: Jul. 9, 2012

(65) Prior Publication Data

US 2014/0007978 A1 Jan. 9, 2014

(51) Int. Cl.
*B65B 1/06* (2006.01)
*B65B 1/36* (2006.01)

(52) U.S. Cl.
CPC .... *B65B 1/06* (2013.01); *B65B 1/36* (2013.01)
USPC ........... 141/106; 141/247; 141/364; 141/391; 141/65

(58) Field of Classification Search
CPC ............ B64B 1/06; B64B 1/36; B64B 1/363; B64B 3/06; B64B 29/06
USPC .................. 141/105–106, 247, 331, 339–340, 141/344–345, 363–364, 391
See application file for complete search history.

(56) References Cited

U.S. PATENT DOCUMENTS

| | | | |
|---|---|---|---|
| 4,165,821 A * | 8/1979 | Martin et al. | 222/129.4 |
| 4,378,078 A * | 3/1983 | Daniels | 222/183 |
| 4,614,859 A * | 9/1986 | Beckering et al. | 392/444 |
| 4,694,740 A * | 9/1987 | Daloz | 99/323.3 |
| 4,848,381 A * | 7/1989 | Livingston et al. | 134/57 R |
| 5,570,816 A | 11/1996 | LaBarbera, Jr. | |
| 5,626,260 A * | 5/1997 | Waldner | 222/144 |
| 5,797,313 A | 8/1998 | Rothley | |
| 5,970,847 A | 10/1999 | Saltzman | |
| 6,173,117 B1 | 1/2001 | Clubb | |
| 6,252,494 B1 * | 6/2001 | Howell | 340/309.8 |
| 6,253,028 B1 | 6/2001 | Roberson | |
| 6,711,990 B1 | 3/2004 | Harrison | |
| 6,829,431 B1 | 12/2004 | Haven et al. | |
| 7,104,184 B2 | 9/2006 | Biderman et al. | |
| D534,028 S | 12/2006 | Artis | |
| 8,360,279 B1 * | 1/2013 | Giles | 222/145.6 |
| 8,584,901 B2 * | 11/2013 | Dooley et al. | 222/129.4 |
| 2005/0238341 A1 | 10/2005 | Thaler et al. | |
| 2009/0001101 A1 * | 1/2009 | Zahradka et al. | 222/228 |
| 2013/0032611 A1 * | 2/2013 | Dooley et al. | 222/129.4 |
| 2013/0186515 A1 * | 7/2013 | Kleiner et al. | 141/12 |

FOREIGN PATENT DOCUMENTS

WO WO2013/019227 A1 * 2/2013 ............ A47J 43/27

* cited by examiner

*Primary Examiner* — Nicolas A Arnett

(57) ABSTRACT

A powdered drink mix dispensing assembly includes a stand that may be placed on a support surface. A hopper is coupled to a top end of the stand. The hopper has powdered drink mix stored in it. A dispenser is coupled to a bottom end of the hopper. The dispenser is selectively actuatable so the dispenser dispenses a measured amount of the powdered drink mix. A bottle is positioned beneath the dispenser. The bottle contains a fluid. The bottle receives the measured amount of powdered drink mix so the powdered drink mix is mixed with the fluid.

15 Claims, 3 Drawing Sheets

POWDERED DRINK MIX DISPENSING ASSEMBLY

BACKGROUND OF THE DISCLOSURE

Field of the Disclosure

The disclosure relates to powdered drink mix dispensing devices and more particularly pertains to a new powdered drink mix dispensing device for dispensing a measured amount of the powdered drink mix.

SUMMARY OF THE DISCLOSURE

An embodiment of the disclosure meets the needs presented above by generally comprising a stand that may be placed on a support surface. A hopper is coupled to a top end of the stand. The hopper has powdered drink mix stored in it. A dispenser is coupled to a bottom end of the hopper. The dispenser is selectively actuatable so the dispenser dispenses a measured amount of the powdered drink mix. A bottle is positioned beneath the dispenser. The bottle contains a fluid. The bottle receives the measured amount of powdered drink mix so the powdered drink mix is mixed with the fluid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
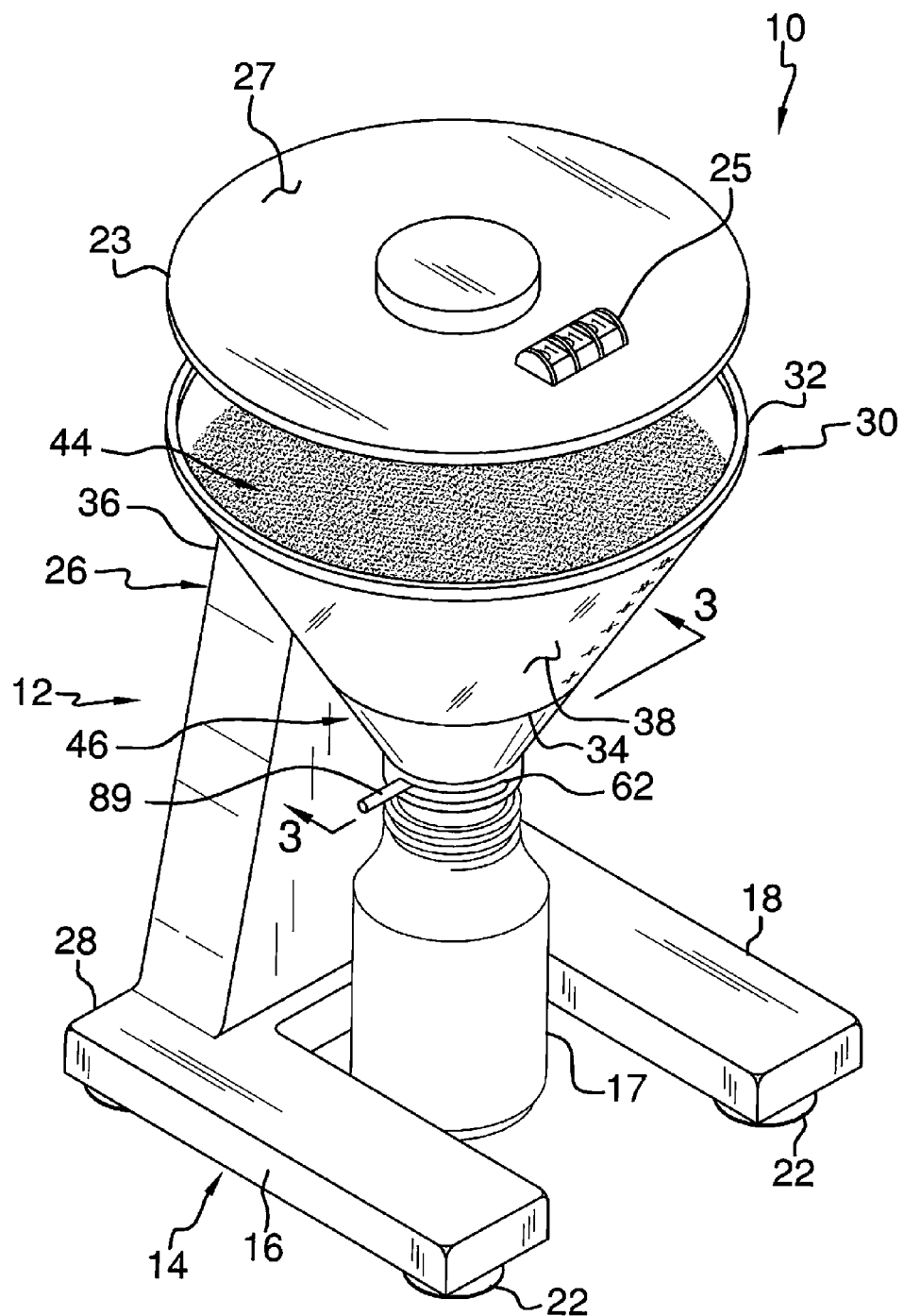
FIG. 1 is a perspective view of a powdered drink mix dispensing assembly according to an embodiment of the disclosure.
Figure 2:
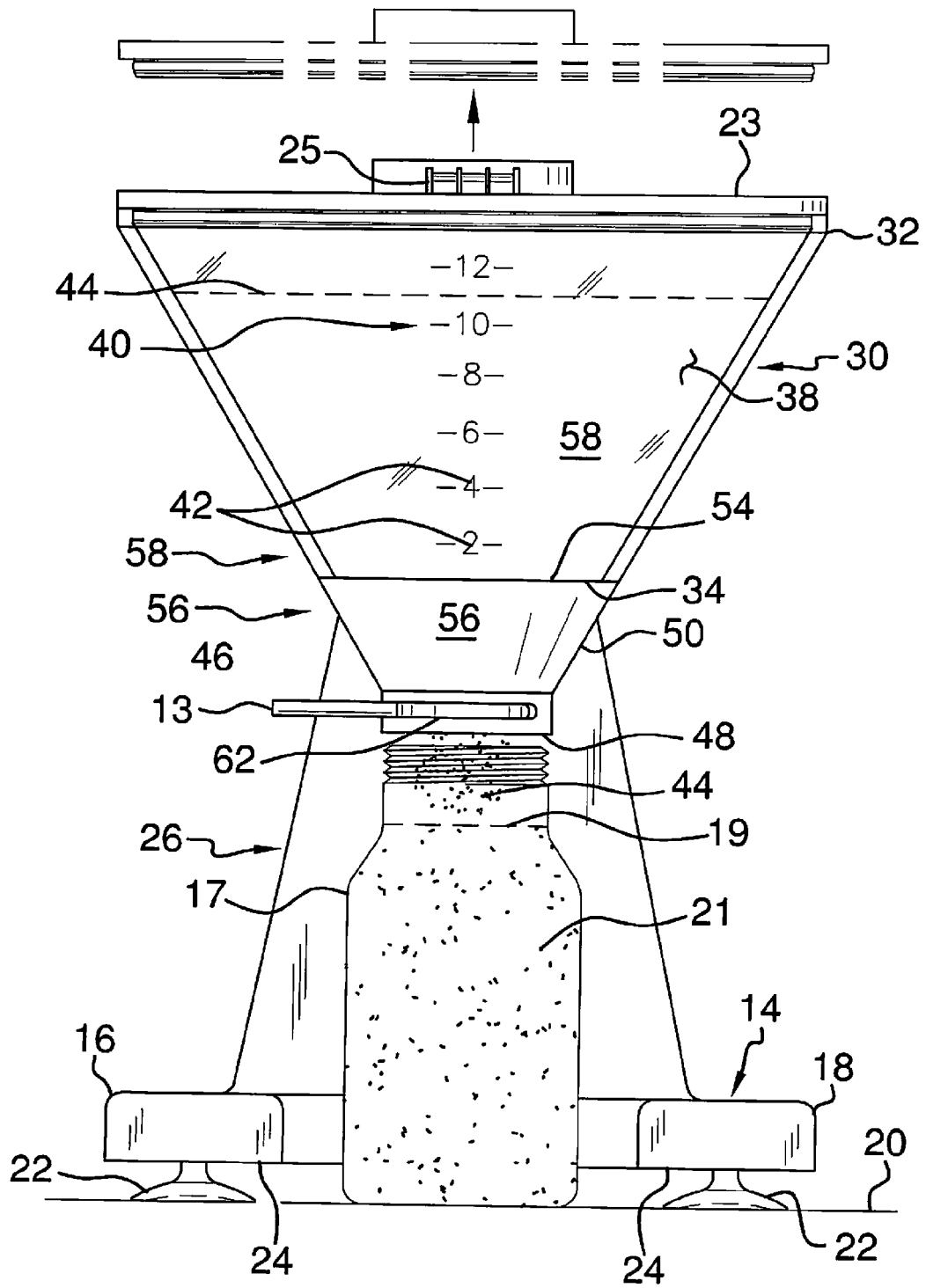
FIG. 2 is a front view of an embodiment of the disclosure.
Figure 3:
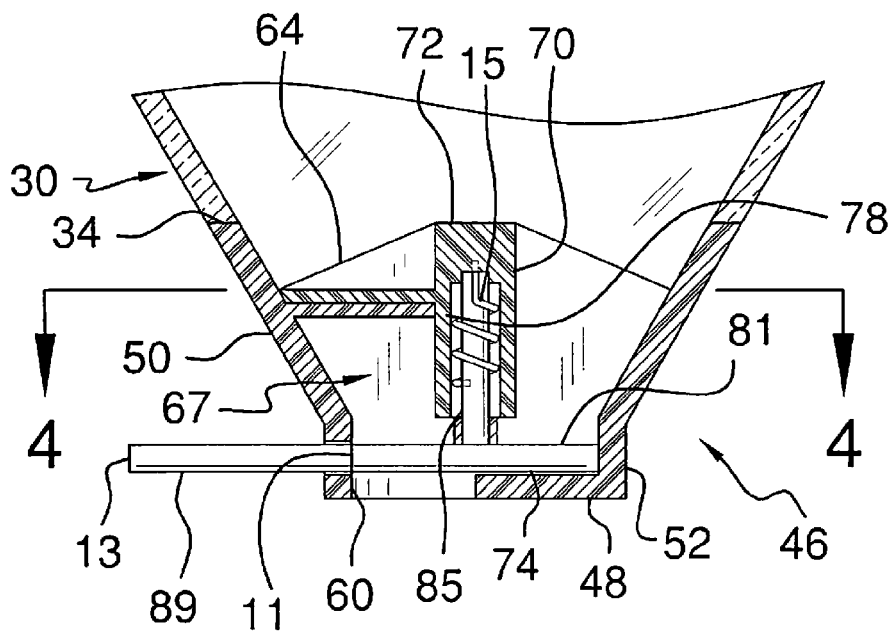
FIG. 3 is a cross sectional view taken along line 3-3 of FIG. 1 of an embodiment of the disclosure.
Figure 4:
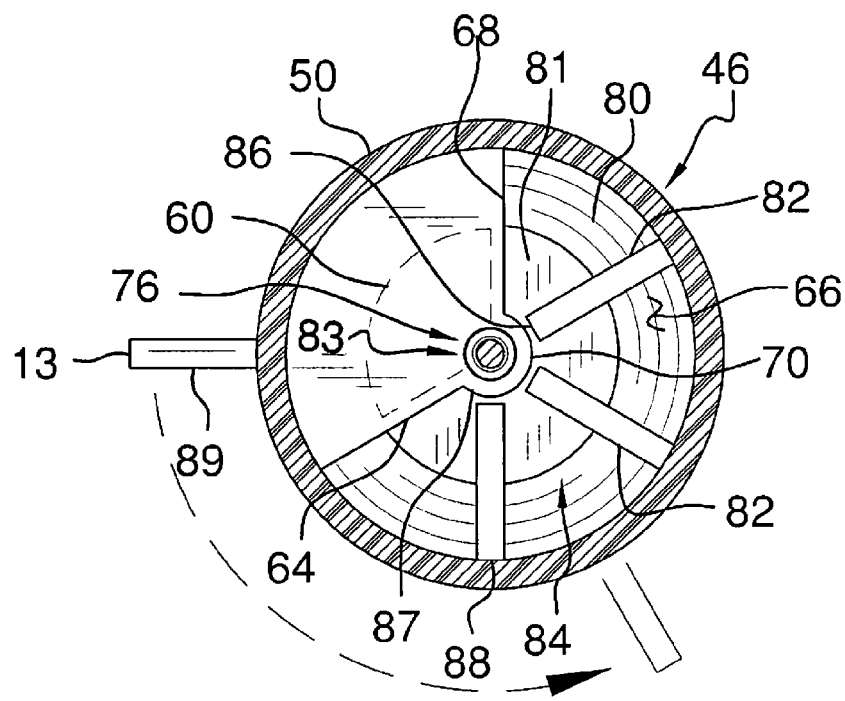
FIG. 4 is a cross sectional view taken along line 4-4 of FIG. 3 of an embodiment of the disclosure.

With reference now to the drawings, and in particular to FIGS. 1 through 4 thereof, a new powdered drink mix dispensing device embodying the principles and concepts of an embodiment of the disclosure and generally designated by the reference numeral 10 will be described.

As best illustrated in FIGS. 1 through 4, the powdered drink mix dispensing assembly 10 generally comprises a stand 12 including a basal section 14. The basal section 14 has a first leg 16 and a second leg 18. The first 16 and second 18 legs are spaced apart from each other. The basal section 14 may abut a support surface 20. A plurality of couplers 22 is coupled to a bottom 24 of the first 16 and second 18 legs. The couplers 22 may comprise suction cups to suctionally engage the support surface 20 to retain the stand 12 on the support surface 20. The stand 12 includes an upright section 26. The upright section 26 is coupled to and extends upwardly from the basal section 14 adjacent to a rear edge 28 of the basal section 14 so the first 16 and second 18 legs extend forwardly from the upright section 26.

A hopper 30 has a top end 32 and a bottom end 34. Each of the top 32 and bottom 34 ends is open. The top end 32 is wider than the bottom end 34 so the hopper 30 has a funnel shape. The top end 32 is removably coupled to an upper end 36 of the upright section 26 of the stand 12. An outer surface 38 of the hopper 30 has indicia 40 printed on it. The indicia 40 may comprise numbers of a measurement graduation 42. The indicia 40 extend from the top end 32 of the hopper 30 toward the bottom end 34 of the hopper 30. A powdered drink mix 44 may be placed in the hopper. The hopper 30 may be comprised of a rigid, translucent material so the powdered drink mix 44 may be visually compared to the indicia 40 to determine the amount of powdered drink mix 44 in the hopper 30. The hopper 30 may have a storage capacity between 12 dry ounces and 16 dry ounces.

A dispenser 46 includes a basal wall 48 and an exterior wall 50 coupled to and extending upwardly from a perimeter edge 52 of the basal wall 48. An upper edge 54 of the exterior wall 50 is coupled to the bottom end 34 of the hopper 30 so an exterior surface 56 of the dispenser 46 is coextensive with an extraneous surface 58 of the hopper 30. The basal wall 48 has a dispenser aperture 60 extending therethrough. The exterior wall 50 has a lever opening 62 extending laterally along the exterior wall 50 proximal the basal wall 48. The dispenser 46 may be removably coupled to the hopper 30 to allow the dispenser 46 to be cleaned.

The dispenser 46 includes a leveling wall 64 coupled to an interior surface 66 of the dispenser 46. The leveling wall 64 is parallel to and spaced upwardly away from the basal wall 48 of the dispenser 46 such that the leveling wall 64 defines an interior space 67 of the dispenser 46. The leveling 64 wall has a compartment aperture 68 extending therethrough. The powdered drink mix 44 in the hopper 30 may enter the interior space 67 of the dispenser 46 through the compartment aperture 68.

A central tower 70 is coupled to the leveling wall 64. The central tower 70 has a topmost end 72 extending upwardly from the leveling wall 64 and a bottommost end 74 extending downwardly from the leveling wall 64. The central tower 70 is positioned proximal a center 76 of the leveling wall 64. The central tower 70 has a well 78 extending upwardly through the bottommost end 74 toward the topmost end 72.

A measuring cup 80 has a basic wall 81 and a plurality of compartment walls 82 coupled to and extending upwardly from the basic wall 81. The compartment walls 82 radiate outwardly from a middle 83 of the measuring cup 80 and are spaced from each other so the compartment walls 82 define a plurality of powder compartments 84. The plurality of powder compartments 84 may comprise three powder compartments 84. Each of the powder compartments 84 may have a capacity between 1 dry ounce and 1.5 dry ounces. The powdered drink 44 mix that enters the interior space 67 of the dispenser 46 may be contained in each of the powder compartments 84.

The measuring cup 80 has a rod 85 coupled to and extending upwardly from a center portion 86 of the basic wall 81. The rod 85 extends upwardly into the well 78 in the central tower 70 so the measuring cup 80 is rotatably coupled to the central tower 70. An inner edge 86 of each of the compartment walls 82 is proximal an outermost surface 87 of the central tower 70 and an outer edge 88 of the compartment walls 82 is proximal the interior surface 66 of the dispenser 46.

The measuring cup 80 includes a lever 89 coupled to and extending outwardly from a peripheral edge 11 of the basic wall 81 of the measuring cup 80. A free end 13 of the lever 89 extends outwardly through the lever opening 62 on the dispenser 46. The lever 89 is actuatable to rotate the measuring cup 80 in a first direction so each of the powder compartments 84 sequentially aligns with the dispenser aperture 60. When the measuring cup 80 is rotated in the first direction the powdered drink mix 44 exits an associated one of the powder compartments 84 through the dispenser aperture 60.

A biasing member 15 is positioned around the rod 85. The biasing member 15 biases the measuring cup 80 to rotate in a second direction is opposite the first direction. The biasing member 15 may comprise a spring. A bottle 17 is positionable beneath the dispenser 46 so the bottle 17 receives the powdered drink mix 44 from the dispenser aperture 60. The bottle 17 may contain a fluid 19 and the bottle 17 receives the measured amount of powdered drink mix 44. The powdered drink mix 44 is mixed with the fluid 19 to form the drink 21. The powdered drink mix 44 may comprise powdered baby formula of any conventional design. The bottle 17 may comprise a baby bottle of any conventional design.

A lid 23 is positionable on the top end 32 of the hopper 30 to close the hopper 30. A date display 25 is coupled to an uppermost surface 27 of the lid 23. The date display 25 is selectively actuatable to display a date so the date display 25 may determine an expiration date of the powdered drink mix 44. The date display 25 may comprise a date wheel of any conventional design.

In use, the powdered drink mix 44 may be stored in the hopper 30 to be used incrementally. After the bottle 17 is positioned beneath the dispenser 46 the lever 89 may be actuated to dispense the measured amount of the powdered drink mix 44 into the bottle 17. The biasing member 15 will return the lever 89 to its original position, causing the powder compartments 84 to be re-filled with powered drink mix 44. The bottle 17 may be filled with the fluid 19 before or after the powdered drink mix 44 is dispensed into the bottle 171

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A powdered drink mix dispensing assembly configured to dispense a measured amount of a powdered drink mix, said assembly comprising:
    a stand being configured to be placed on a support surface;
    a hopper being coupled to a top end of said stand, said hopper having powdered drink mix stored therein;
    a dispenser coupled to a bottom end of said hopper, said dispenser being selectively actuatable such that said dispenser dispenses a measured amount of the powdered drink mix;
    a bottle being positioned beneath said dispenser, said bottle containing a fluid, said bottle receiving the measured amount of powdered drink mix whereby the powdered drink mix is mixed with the fluid;
    said dispenser including a basal wall and an exterior wall coupled to and extending upwardly from a perimeter edge of said basal wall, an upper edge of said exterior wall being coupled to said bottom end of said hopper such that an exterior surface of said dispenser is coextensive with an extraneous surface of said hopper, said basal wall having a dispenser aperture extending therethrough, said exterior wall having a lever opening extending laterally along said exterior wall proximal said basal wall; and
    said dispenser including a leveling wall coupled to an interior surface of said dispenser, said leveling wall being parallel to and spaced upwardly away from said basal wall of said dispenser such that said leveling wall defines an interior space of said dispenser, said leveling wall having a compartment aperture extending therethrough.

2. The assembly according to claim 1, further including said stand including a basal section, said basal section having a first leg and a second leg, said first and second legs being spaced apart from each other, said basal section being configured to abut the support surface.

3. The assembly according to claim 2, further including said stand including an upright section, said upright section being coupled to and extending upwardly from said basal section adjacent to a rear edge of said basal section such that said first and second legs extend forwardly from said upright section.

4. The assembly according to claim 3, further including said hopper having a top end and a bottom end, each of said top and bottom end being open, said top end being wider than said bottom end whereby said hopper has a funnel shape, said top end being coupled to an upper end of said upright section of said stand.

5. The assembly according to claim 4, further including a lid being positionable on said top end of said hopper to close said hopper.

6. The assembly according to claim 5, further including a date display coupled to an uppermost surface of said lid, said date display being selectively actuatable to display a date such that said date display is configured to determine an expiration date of the powdered drink mix.

7. The assembly according to claim 1, further including said hopper having a top end and a bottom end, an outer surface of said hopper having indicia thereon, said indicia comprising numbers of a measurement graduation, said indicia extending from said top end of said hopper toward said bottom end of said hopper.

8. The assembly according to claim 1, further including a central tower being coupled to said leveling wall, said central tower having a topmost end extending upwardly from said leveling wall and a bottommost end extending downwardly from said leveling wall, said central tower being positioned proximal a center of said leveling wall, said central tower having a well extending upwardly through said bottommost end toward said topmost end.

9. The assembly according to claim 8, further including a measuring cup having a basic wall and a plurality of compartment walls coupled to and extending upwardly from said basic wall, said compartment walls radiating outwardly from a middle of said measuring cup and being spaced from each other whereby said compartment walls define a plurality of powder compartments.

10. The assembly according to claim 9, further including said measuring cup having a rod coupled to and extending upwardly from a center portion of said basic wall, said rod extending upwardly into said well in said central tower whereby said measuring cup is rotatably coupled to said central tower such that an inner edge of each of said compartment walls is proximal an outermost surface of said central tower and an outer edge of said compartment walls is proximal said interior surface of said dispenser.

11. The assembly according to claim 10, further including said measuring cup including a lever coupled to and extending outwardly from a peripheral edge of said basic wall of said measuring cup, a free end of said lever extending outwardly through said lever opening on said dispenser.

12. The assembly according to claim 11, further including said lever being actuatable to rotate said measuring cup in a first direction such that each of said powder compartments sequentially aligns with said dispenser aperture whereby the powdered drink mix exits an associated one of said powder compartments through said dispenser aperture.

13. The assembly according to claim 12, further including a biasing member positioned around said rod, said biasing member biasing said measuring cup to rotate in a second direction being opposite said first direction.

14. The assembly according to claim 1, further including said bottle being positionable beneath said dispenser whereby said bottle receives the powdered drink mix from said dispensing aperture.

15. A powdered drink mix dispensing assembly configured to dispense a measured amount of the powdered drink mix, said assembly comprising:
- a stand including a basal section, said basal section having a first leg and a second leg, said first and second legs being spaced apart from each other, said basal section being configured to abut a support surface, said stand including an upright section, said upright section being coupled to and extending upwardly from said basal section adjacent to a rear edge of said basal section such that said first and second legs extend forwardly from said upright section;
- a hopper having a top end and a bottom end, each of said top and bottom ends being open, said top end being wider than said bottom end whereby said hopper has a funnel shape, said top end being coupled to an upper end of said upright section of said stand, an outer surface of said hopper having indicia thereon, said indicia comprising numbers of a measurement graduation, said indicia extending from said top end of said hopper toward said bottom end of said hopper;
- a dispenser including a basal wall and an exterior wall coupled to and extending upwardly from a perimeter edge of said basal wall, an upper edge of said exterior wall being coupled to said bottom end of said hopper such that an exterior surface of said dispenser is coextensive with an extraneous surface of said hopper, said basal wall having a dispenser aperture extending therethrough, said exterior wall having a lever opening extending laterally along said exterior wall proximal said basal wall, said dispenser including;
- a leveling wall coupled to an interior surface of said dispenser, said leveling wall being parallel to and spaced upwardly away from said basal wall of said dispenser such that said leveling wall defines an interior space of said dispenser, said leveling wall having a compartment aperture extending therethrough;
- a central tower being coupled to said leveling wall, said central tower having a topmost end extending upwardly from said leveling wall and a bottommost end extending downwardly from said leveling wall, said central tower being positioned proximal a center of said leveling wall, said central tower having a well extending upwardly through said bottommost end toward said topmost end;
- a measuring cup having a basic wall and a plurality of compartment walls coupled to and extending upwardly from said basic wall, said compartment walls radiating outwardly from a middle of said measuring cup and being spaced from each other whereby said compartment walls define a plurality of powder compartments, said measuring cup having a rod coupled to and extending upwardly from a center portion of said basic wall, said rod extending upwardly into said well in said central tower whereby said measuring cup is rotatably coupled to said central tower such that an inner edge of each of said compartment walls is proximal an outermost surface of said central tower and an outer edge of said compartment walls is proximal said interior surface of said dispenser, said measuring cup including;
- a lever coupled to and extending outwardly from a peripheral edge of said basic wall of said measuring cup, a free end of said lever extending outwardly through said lever opening on said dispenser, said lever being actuatable to rotate said measuring cup in a first direction such that each of said powder compartments sequentially aligns with said dispenser aperture whereby the powdered drink mix exits an associated one of said powder compartments through said dispenser aperture;
- a biasing member positioned around said rod, said biasing member biasing said measuring cup to rotate in a second direction being opposite said first direction;
- a bottle being positionable beneath said dispenser whereby said bottle receives the powdered drink mix from said dispensing aperture, said bottle containing a fluid, said bottle receiving the measured amount of powdered drink mix whereby the powdered drink mix is mixed with the fluid;
- a lid being positionable on said top end of said hopper to close said hopper; and
- a date display coupled to an uppermost surface of said lid, said date display being selectively actuatable to display a date such that said date display is configured to determine an expiration date of the powdered drink mix.

* * * * *